(12) United States Patent
Konshak et al.

(10) Patent No.: US 7,885,037 B2
(45) Date of Patent: Feb. 8, 2011

(54) DISK STORAGE CARTRIDGE

(75) Inventors: Michael V. Konshak, Louisville, CO (US); Thai Nguyen, Thornton, CO (US); Michael L. Leonhardt, Longmont, CO (US)

(73) Assignee: Oracle America, Inc., Redowood City, CA (US)

( * ) Notice: Subject to any disclaimer, the term of this patent is extended or adjusted under 35 U.S.C. 154(b) by 802 days.

(21) Appl. No.: 11/506,263

(22) Filed: Aug. 18, 2006

(65) Prior Publication Data

US 2008/0043371 A1 Feb. 21, 2008

(51) Int. Cl.
G11B 23/03 (2006.01)
G11B 33/14 (2006.01)

(52) U.S. Cl. .............. 360/133; 360/97.02; 361/679.48; 361/695

(58) Field of Classification Search .......... 361/679.33, 361/679.37, 679.46–679.54, 688, 690, 695, 361/697, 736; 360/97.02, 97.03, 133; 720/649
See application file for complete search history.

(56) References Cited

U.S. PATENT DOCUMENTS

| | | | | | |
|---|---|---|---|---|---|
| 3,553,662 | A * | 1/1971 | Goss | ...................... | 360/78.05 |
| 3,864,747 | A * | 2/1975 | Pejcha | ...................... | 360/97.03 |
| 5,185,700 | A * | 2/1993 | Bezos et al. | ................. | 701/35 |
| 5,214,550 | A * | 5/1993 | Chan | ...................... | 360/97.01 |
| 5,235,481 | A * | 8/1993 | Kamo et al. | ............. | 360/97.01 |
| 5,822,184 | A * | 10/1998 | Rabinovitz | ............. | 361/679.31 |
| 5,970,030 | A * | 10/1999 | Dimitri et al. | ........... | 369/30.46 |
| 6,483,660 | B1 * | 11/2002 | Akagi et al. | ............. | 360/98.01 |
| 6,867,942 | B2 * | 3/2005 | Albrecht et al. | ............... | 360/69 |
| 6,931,304 | B1 * | 8/2005 | Miller et al. | ................ | 700/245 |
| 6,956,738 | B2 * | 10/2005 | Bruner et al. | .......... | 361/679.33 |
| 7,012,805 | B2 * | 3/2006 | Shah et al. | ............. | 361/679.36 |
| 7,036,132 | B1 * | 4/2006 | Coffin et al. | ................ | 720/654 |
| 7,039,924 | B2 * | 5/2006 | Goodman et al. | ........... | 720/600 |
| 7,200,001 | B2 * | 4/2007 | Spychalla | ............... | 361/679.33 |
| 7,312,982 | B2 * | 12/2007 | Bruner et al. | .......... | 361/679.33 |
| 7,322,098 | B2 * | 1/2008 | Buitron et al. | ................ | 29/604 |
| 7,505,688 | B2 * | 3/2009 | Guenter et al. | ............. | 398/138 |
| 7,508,622 | B2 * | 3/2009 | Martin et al. | ............ | 360/97.01 |
| 7,548,418 | B2 * | 6/2009 | Martin et al. | .......... | 361/679.37 |
| 2003/0223756 | A1 * | 12/2003 | Tatum et al. | ................ | 398/135 |
| 2004/0181388 | A1 * | 9/2004 | Yip et al. | ...................... | 703/25 |
| 2005/0013110 | A1 * | 1/2005 | Shah et al. | .................. | 361/685 |
| 2006/0062116 | A1 * | 3/2006 | Ishibashi | ................ | 369/47.35 |
| 2006/0077778 | A1 * | 4/2006 | Tatum et al. | ............. | 369/44.11 |
| 2006/0152847 | A1 * | 7/2006 | Stiles et al. | ............. | 360/97.01 |

(Continued)

FOREIGN PATENT DOCUMENTS

EP 1372155 A2 * 12/2003

(Continued)

Primary Examiner—William J Klimowicz
(74) Attorney, Agent, or Firm—Osha • Liang LLP

(57) ABSTRACT

A media cartridge including a first substantially rectangular surface, a second substantially rectangular surface, and one or more side surfaces, where the first substantially rectangular surface and the second substantially rectangular surface are connected by the one or more side surfaces. Further, a disk drive assembly is enclosed by the first substantially rectangular surface, the second substantially rectangular surface, and the one or more side surfaces. In addition, the media cartridge includes a cooling component is configured to cool the disk drive assembly.

11 Claims, 7 Drawing Sheets

U.S. PATENT DOCUMENTS

2008/0157939 A1 * 7/2008 Sutardja ................ 340/310.12

FOREIGN PATENT DOCUMENTS

| JP | 06267262 A | * | 9/1994 |
| JP | 2002163885 A | * | 6/2002 |
| JP | 2003179524 A | * | 6/2003 |
| JP | 2006114123 A | * | 4/2006 |
| WO | WO 0022624 A1 | * | 4/2000 |

* cited by examiner

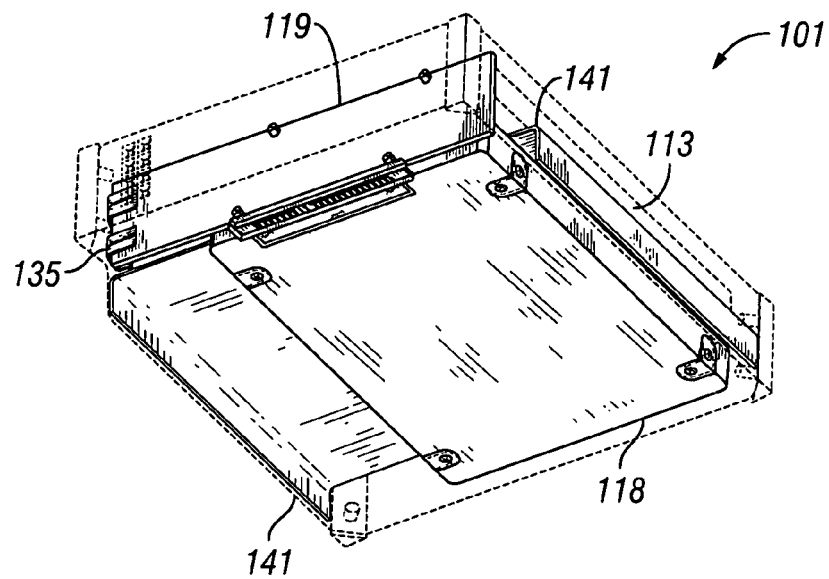
FIG. 9
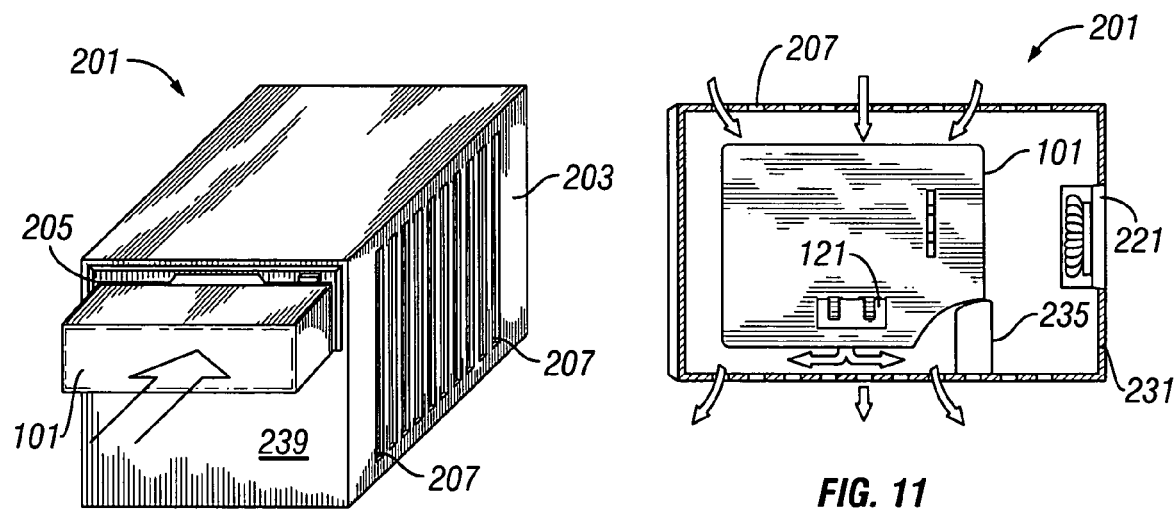
FIG. 10
FIG. 11

DISK STORAGE CARTRIDGE

BACKGROUND

Automated media storage libraries store and retrieve information stored in media objects such as media cartridges. An automated media storage library stores a media cartridge within a media cartridge storage cell. A robotic mechanism (e.g., robot, picker, handbot, accessor, etc.) moves the media cartridges between the storage cells and a media cartridge reader. One type of media cartridge has a magnetic tape mounted on a spool mechanism. Designers of media cartridges tend to avoid revising the external shape of a new media cartridge design as compared to previous designs. When a designer keeps the size and form factor the same, the designer permits the media cartridge to remain compatible with older storage libraries.

Another type of media cartridge houses magnetic disk drives. Such disk drives generally engage with a motherboard or other components using a disk drive interface. Such interfaces include Small Computer System Interface (SCSI), Serial Advanced Technology Attachment (SATA), Integrated Drive Electronics (IDE), and other similar interfaces. The physical connectors typically used for each such interface have contact counts that may exceed 40 connectors. Such connectors tend to require a relatively high insertion force. All contacts of the disk drive must form a good electrical connection to the contacts of a motherboard or other component providing electrical connectivity to the computer. Nevertheless, designers of such connectors use a design constraint that a connector is used only a few times. A common design constraint or assumption is that the connector is to be used for the installation of the drive in a higher level assembly. Consequently, such connectors tend to have a mean time between failure of about 200 mounting and dismounting cycles for a disk drive.

Disk drives, while in operation, generate heat both from friction as well as power dissipated within the electrical components of the disk drive. Excessive heat shortens the life expectancy of a disk drive. Magnetic tape-based cartridges can typically store information for up to 30 years with proper storage conditions and withstand 1000's of insertion cycles. Magnetic disk drives however, typically have data storage lifetimes of about five years and withstand 100's of insertions at best. Operating drives at a lower temperature and at lower duty cycles tends to extend their lifetimes.

SUMMARY

In general, in one aspect, the invention relates to a media cartridge having a first substantially rectangular surface. The media cartridge also has a second substantially rectangular surface. The media cartridge has a plurality of side surfaces, wherein the first substantially rectangular surface and the second substantially rectangular surface are connected by the plurality of side surfaces. A disk drive assembly is enclosed by the first substantially rectangular surface, the second substantially rectangular surface, and the plurality of side surfaces and a first cooling component is configured to cool the disk drive assembly.

In general, in one aspect, the invention relates to a reader including a frame, a guide supported by the frame, at least one sliding contact attached to the frame, and a cooling component attached to the frame. The frame has media cartridge that may be inserted through the guide to matingly engage the at least one sliding contact, where the media cartridge may respond to a data access signal with a data signal.

In general, in one aspect, the invention relates to a method for cooling a media cartridge comprising mating the media cartridge to the reader, providing power to the media cartridge in response to mating the media cartridge to the reader, and activating a cooling component wherein the cooling component transfers heat from the media cartridge.

Other aspects of the invention will be apparent from the following description and the appended claims.

BRIEF DESCRIPTION OF DRAWINGS

FIG. 9 shows another view of the internal components of the media cartridge as shown in the illustrative embodiment of FIG. 8.

FIG. 10 shows a reader in accordance with an illustrative embodiment of the present invention.

FIG. 11 shows a cross-section of a first illustrative embodiment of a reader with a media cartridge inside.

DETAILED DESCRIPTION

Figure 1:
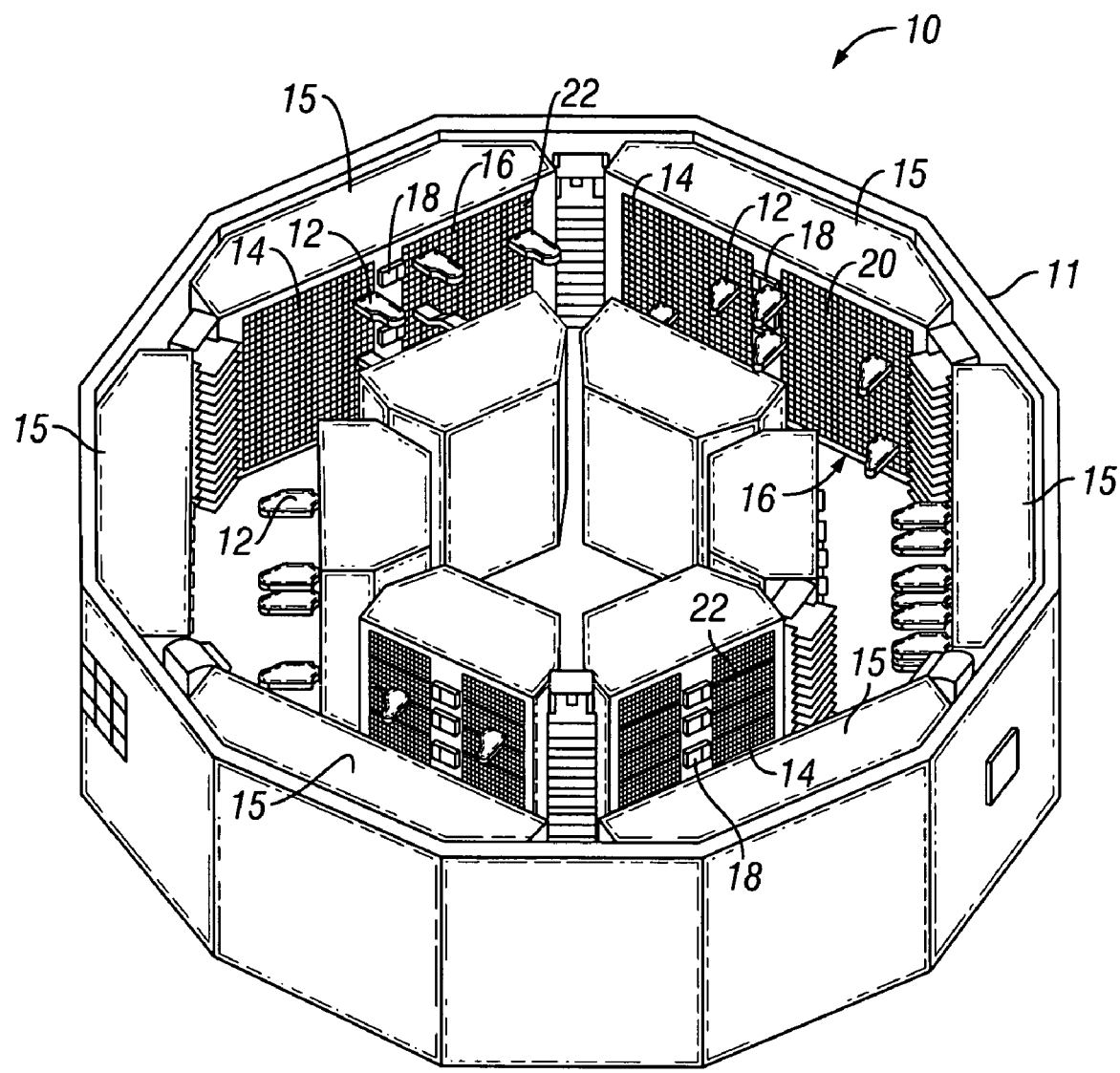
FIG. 1 shows an automated storage library.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows an automated storage library (10) in accordance with an illustrative embodiment of the invention. Storage library (10) includes a cylindrical housing enclosure (11) containing multiple independent robotic mechanisms (12) to enable the storage library to concurrently manipulate different media cartridges (14). Independent robotic mechanisms may be, for example, robotic pods, accessors, or other independent robotic mechanisms. Storage library (10) includes one or more arrays (15) of media cartridge storage cells (16) and media cartridge players (18). A system of horizontal tracks (22) guides independent robotic mechanisms (12) through all of the locations of the arrays (15). Each pair of tracks corresponds to a respective row of an array. Media cartridge storage cells (16) and media cartridge players (18) are in the rows of the arrays (15). Each media cartridge storage cell (16) may house a single media cartridge (14). Each robotic mechanism (12) may move on horizontal tracks (22) around storage library (10) to access media cartridge storage cells (16) and media cartridge players (18). Where a player is a device which physically and electrically interfaces with the media cartridge to provide access to the cartridge's data storage medium for the storage and retrieval of data. Robotic mechanisms (12) contain a movable carriage for transporting robotic components on horizontal tracks (22) of storage library (10). Robotic components may be, for example, media cartridge pickers, bar code reading devices, and other task oriented sub-modules.

Figure 2:
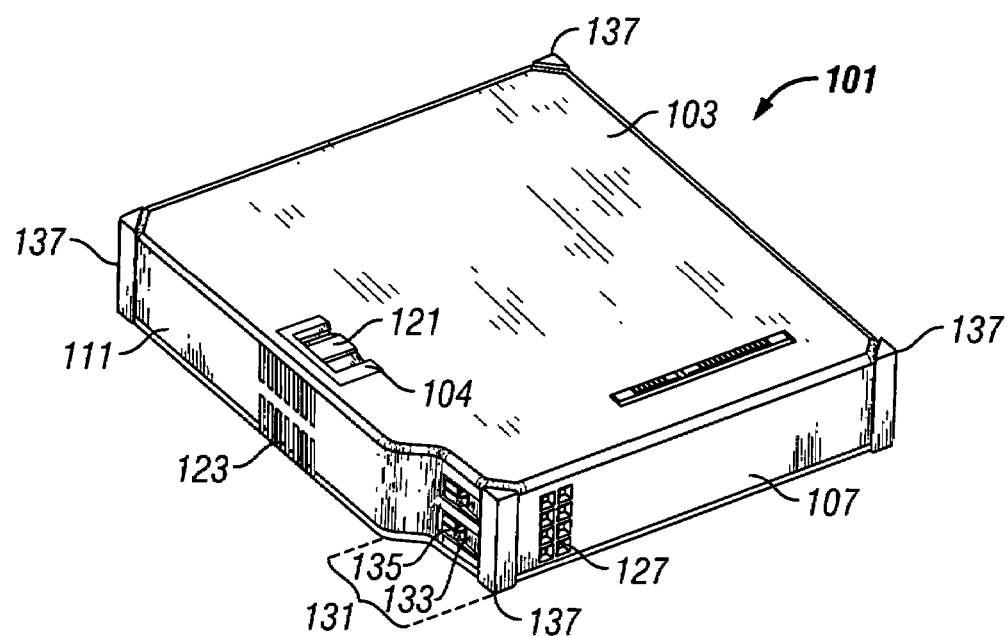
FIG. 2 shows a media cartridge in accordance to an illustrative embodiment of the present invention.

FIG. 2 shows a media cartridge in accordance with an illustrative embodiment of the present invention. The media cartridge includes a first substantially rectangular surface (103) parallel and opposite to a second substantially rectangular surface (not shown). A set of side surfaces (107 and 111) (including others not shown) join first substantially rectangular surface (103) and the second substantially rectangular surface (not shown). The media cartridge shell includes the side surfaces and the substantially rectangular surface. Some or all the side surfaces, for example, side surface (107) and side surface (111) may be made from materials having a high thermal transfer coefficient. Such materials include, for example, some plastics, zinc die-casting metal, and other materials.

The media cartridge may transmit and receive data through the use of a transceiver. A transceiver may be, for example, a wireless transceiver or a data interface component. The side surface (107) has eight optical apertures (127) arranged in two columns of four each. An optical aperture is a window or an opening that allows optical signals to pass through. The optical aperture may be covered by a material that filters desired wavelengths from incident electromagnetic waves. The eight optical apertures (127) permit eight transceivers within the media cartridge (101) to transmit and receive optical signals.

The media cartridge relies on a cooling component to cool electrical components enclosed therein. A cooling component may be, for example, a fan, a heat sink, or other device capable of dissipating heat. A fan (121) is disposed between the substantially rectangular surfaces, for example, substantially rectangular surface (103). The substantially rectangular surfaces have at least one cut-out, for example, cut-out (104). The cut-out (104) forms a mounting point for the fan (121). The fan (121) is between the substantially rectangular surfaces, for example substantially rectangular surface (103). The fan (121) may direct air through the side surface (111). The fan may rotate about an axis that is substantially perpendicular to the side surface (111). The side surface (111) has vents (123) in front of the fan (121). The vents (123) allow air, forced by the fan (121), to flow out of the media cartridge (101).

The side surface (111) has an indentation (131). The indentation (131) provides a keying method that guides correct insertion of the media cartridge (101) into a reader. The sliding contacts (135) are part of the power interface component. The sliding contacts (135) may extend substantially parallel to the side surface (111) along the indentation. In one embodiment of the invention, the sliding contacts (135) bend to pass through slits (133) within the media cartridge (101). Sliding contact options can include other configurations of pressure contacts without sliding action. For example, situations where the force between contacts is applied perpendicular to a contact plane; the action of the electrical current flow in the contact insures a gas-tight connection. Bumpers (137) may be added to an illustrative embodiment at the edges formed by the side surfaces. The bumpers (137) may be made of a shock absorbing material, such as, for example, rubber, or high-damp silicon. Additional bumpers may be placed on other edges formed in part by the side surfaces. A frame or skeleton of shock absorbing material may be formed to elastically engage with most or all of the edges of the media cartridge (101) yet still keep much of the surfaces uncovered.

Figure 3:
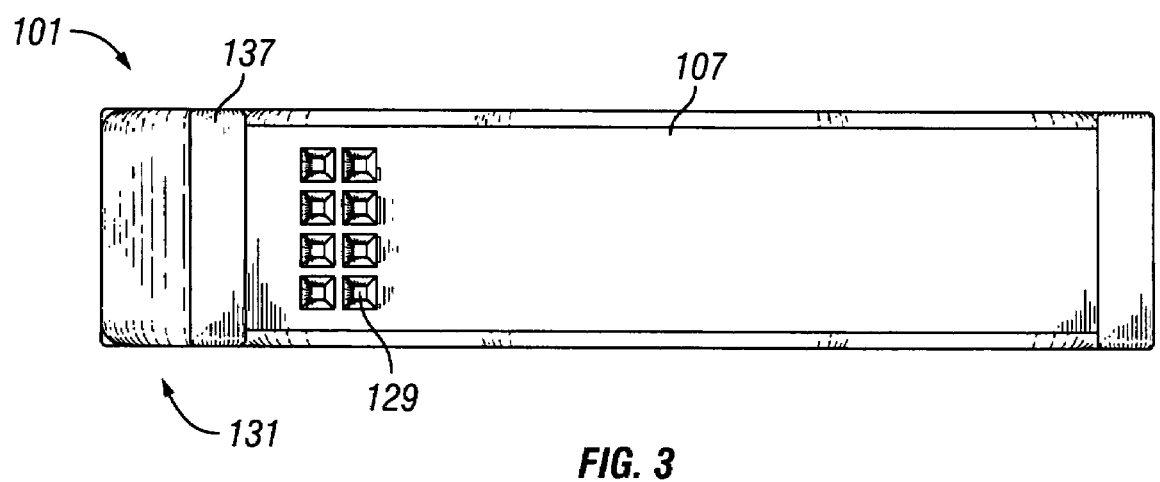
FIG. 3 shows the front view of the media cartridge as shown in the illustrative embodiment of FIG. 2.

FIG. 3 shows the front view of the media cartridge as shown in the embodiment of FIG. 2. The shown side surface (107) of the media cartridge (101) is inserted first when the media cartridge (101) is inserted into a reader (not shown). The indentation (131) provides a keying method to allow an operator function (i.e., delivered by a robot or manually) to correctly insert the media cartridge (101) into the reader. The reader can communicate with the individual disk drives via optical transceivers (129). An optical transceiver is a device that may transmit and receive optical signals. One application of an optical transceiver is to convert data received in an optical form to an electrical form (or vice-versa).

Figure 4:
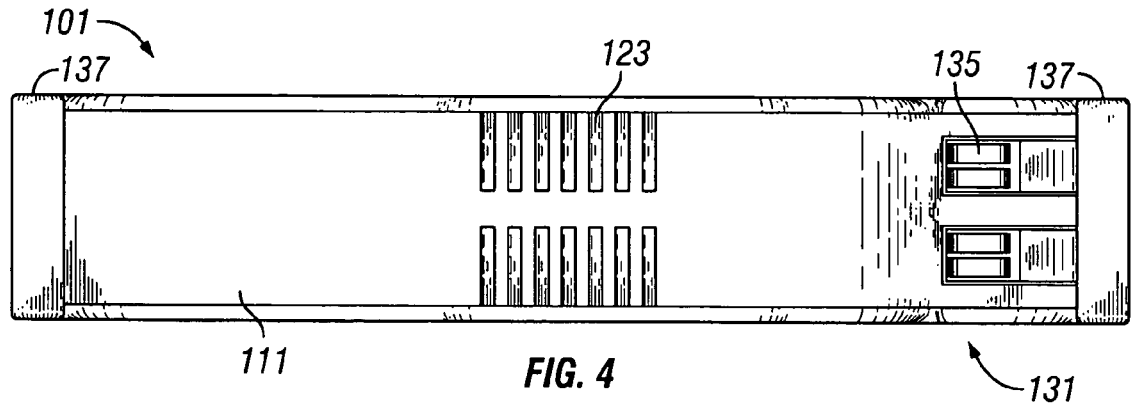
FIG. 4 shows the side view of the media cartridge as shown in the illustrative embodiment of FIG. 2.

FIG. 4 shows the side view of the media cartridge as shown in the embodiment of FIG. 2. The axis of rotation of the fan (121) is perpendicular to this side surface (111). The vents (123) are in front of the fan (121). The indentation (131) has slits that allow sliding contacts (135) of the power interface component to protrude from the media cartridge (101). The power interface component includes four sliding contacts (135). The sliding contacts (135) can supply power to all the components inside the media cartridge (101). The power interface component can also carry data signals superimposed on the power signal. Thus there is an option to use the power interface component to carry the data and control signals to and from the disk drive. The media cartridge can use the power interface component alone or in combination with the wireless transceiver function to carry the necessary data and control signals to and from the disk drive. The power interface component may also include circuitry (not shown) that allows the cartridge to receive power through inductive coupling. Inductive coupling refers to transfer of energy from one circuit component to another through a shared magnetic field. A change in current flow through one circuit component induces a change in current in the other circuit component. The first circuit component may be housed inside a reader while the second circuit component may be housed inside the cartridge. The reader may regulate the change in current in the first circuit component, and the cartridge may generate desired power from the change in current in the second circuit component. The benefit of an inductive coupling power supply is the elimination of moving or touching parts which translates to minimal wear and maintenance.

Figure 5:
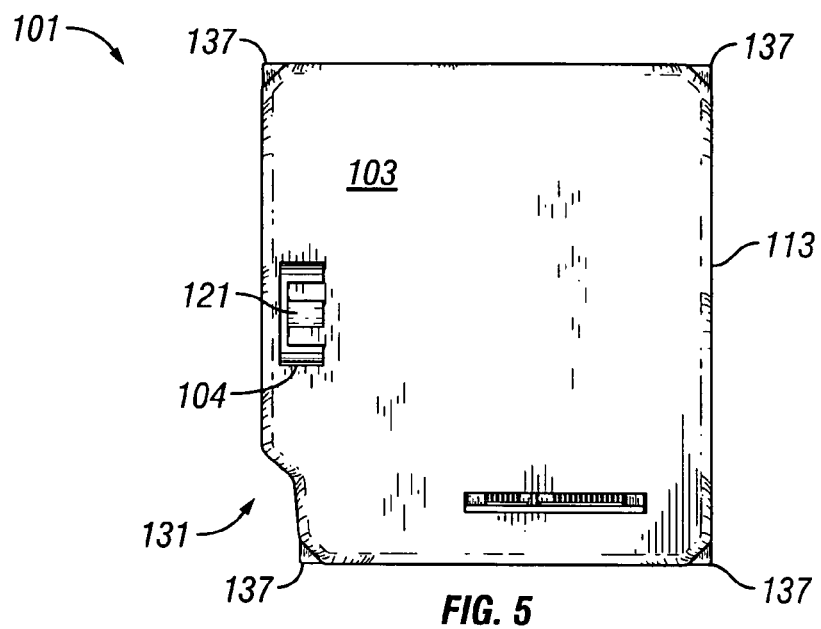
FIG. 5 shows the top view of the media cartridge as shown in the illustrative embodiment of FIG. 2.

FIG. 5 shows the top view of the media cartridge as shown in the embodiment of FIG. 2. Indentation (131) provides a keying mechanism to enable correct insertion of the media cartridge (101) into the reader (not shown). The bumpers (137) include four corners of the media cartridge (101). In this exemplary embodiment of the present invention, the width of the fan (121) and the width of the media cartridge (101) are nearly the same. The substantially rectangular surface (103) of FIG. 5 and the second substantially rectangular surface have cut-outs to accommodate the fan (121) within the media cartridge. In addition, the cut-outs on the surfaces may fasten the fan (121) in the desired position without requiring screws.

Figure 6:
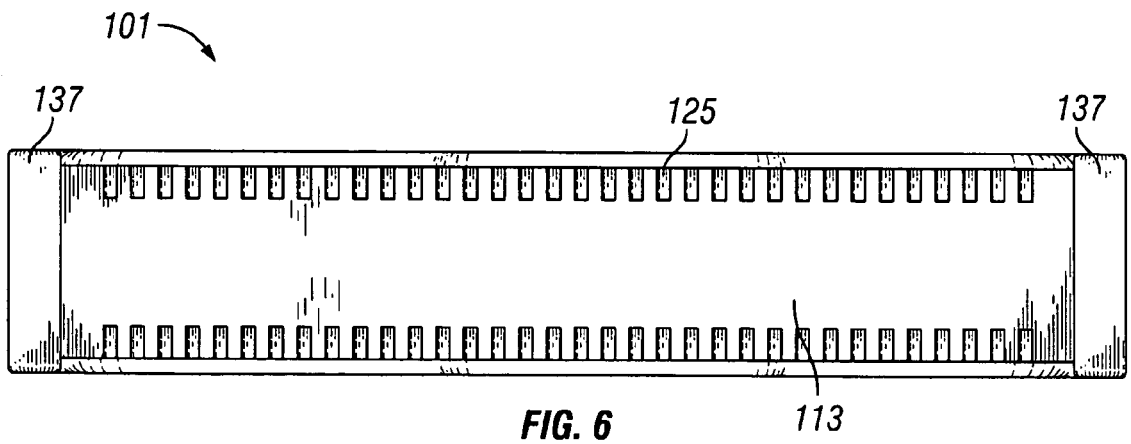
FIG. 6 shows another side view of the media cartridge as shown in the illustrative embodiment of FIG. 2.

FIG. 6 shows the side vents (125) on the side surface (113) in accordance with an embodiment of the present invention. The vents (125) allow airflow between the media cartridge (101) and the surrounding environment. The vents (125) can be of any suitable size and pattern. The vents may be on any surface of the media cartridge (101). For example, the vents (125) may be on the side surface (113), opposite to the side surface (111) and adjacent to the fan (121). When the fan (121) blows, the vents (125) may allow cooler air to enter into the media cartridge. In the case where the fan is outside the media cartridge, for example inside the reader chassis, the vents (125) can allow airflow in or out of the media cartridge.

Figure 7:
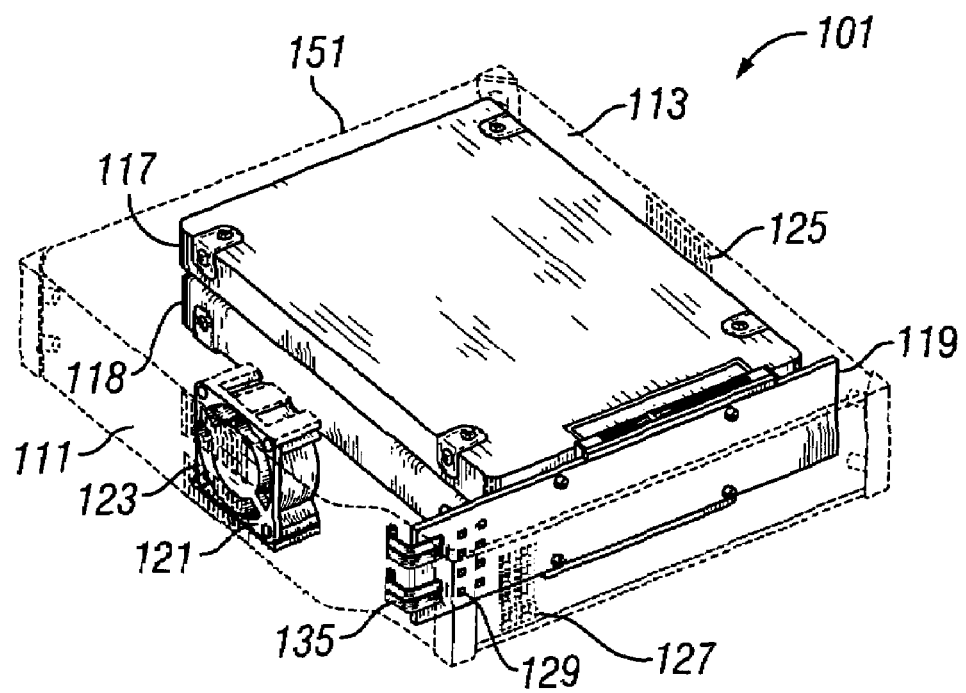
FIG. 7 shows the internal components of the media cartridge with fan cooling in accordance with an illustrative embodiment of the present invention.

FIG. 7 illustrates the internal components of the media cartridge in accordance with an embodiment of the present invention. A first disk drive assembly includes a disk drive (117) and a second disk drive assembly comprising of disk drive (118). The disk drives may be substantially parallel, each to the other, and enclosed by the media cartridge shell (151). Data stored in one disk drive assembly (117) can be an exact copy of the second disk drive assembly (118). This duplicated storage is called mirroring. Mirroring improves the reliability of data storage and retrieval by creating redundancy. Each disk drive may be a 2.5 inch small form factor (SFF) serial advanced technology attachment (SATA) interface disk drives. The SFF of the disk drives allow two such drives to fit inside a single media cartridge. Smaller drives may be used in the future.

The fan (121) cools the interior of the media cartridge through forced convection. The fan forces air from the interior of the media cartridge to the outside through vents (123) on side surface (111). The fan (121) also forces air to enter through vents (125) on side surface (113). When the disk drives (117 and 118) generate heat, the fan (121) provides cooling of the drives (117 and 118) by forcing hot air out of the media cartridge and forcing cool air to pass over the disk drives. Although the present embodiment shows the vents (123) on the side surface (111), vents may be on any one or more than one surface of the media cartridge (101). In addition, more than one fan can be disposed within the media cartridge to provide additional cooling. The cartridge may also include a thermostatic controller (not shown) to regulate the cooling provided by the cooling components. A thermostatic controller is a device for maintaining the temperature of the cartridge within a desired range. The thermostatic controller may be a mechanical, electrical, electromechanical, or any other type of thermostatic controller. The internal temperature of the cartridge may be sensed by the thermostatic controller via a plurality of temperature sensors (not shown). The temperature sensors may be a contact (e.g. thermocouple) or a non-contact (e.g. infrared) type of sensor. These temperature sensors may by housed inside the cartridge (101) or outside the cartridge. The output of the thermostatic controller may control the rate of cooling provided by the cooling component. This can be achieved, as an example, by connecting the output of the thermostatic controller to the power supply of the fan (121). The thermostatic controller may then regulate the speed of the fan (121) to vary the rate of cooling.

FIG. 7 further shows a printed circuit board (PCB) (119) for providing interface between the disk drives (117 and 118), and the power interface component and data interface component. The power interface component, including the sliding contacts (135), makes electrical contact with the printed circuit board (119). The printed circuit board (119) includes circuitry to supply power to the disk drives (117 and 118) from the sliding contacts (135). In addition, the printed circuit board (119) can also provide electrical connectivity between a data signal carried on the sliding contacts (135) and the disk drives (117 and 118). A SATA disk drive may use four connections for data communication. The four sliding contacts (135) permit a reader to communicate with the disk drives (117 and 118). The printed circuit board (119) controls access to the disc drives (117 and 118). Eight optical transceivers (129) are disposed on the surface of the printed circuit board (119) in alignment with the eight optical apertures (127) on the side surface (107). Four optical transceivers are associated with the data and control connections of one disk drive (117). The remaining four optical transceivers are associated with the disk drive (118). Alternate embodiments of the printed circuit board (119) can also include other wireless data interface components. Such wireless data interface components allow data and control connections between the reader and the disk drives (117 and 118). The hard drive may respond to the data access signal by providing data stored on the hard drive.

Alternate embodiments for the optical transceivers may include other wireless approaches including the use of one or more radio frequency, capacitive coupling, and inductive coupling to carry the data and control signals to and from the data cartridge. FIG. 7 depicts the optical transceiver option. In an alternate embodiment, the optical aperture may be replaced by other technology appropriate interfaces, e.g. small plates for capacitive coupling, transformer primary/secondary winding for inductive coupling, and antennas for Radio Frequency (RF) coupling. In the case of the inductive coupling option, the transformer windings may provide higher current power supply signals and serve as an alternative for sliding contacts to carry the cartridges power supply current.

Figure 8:
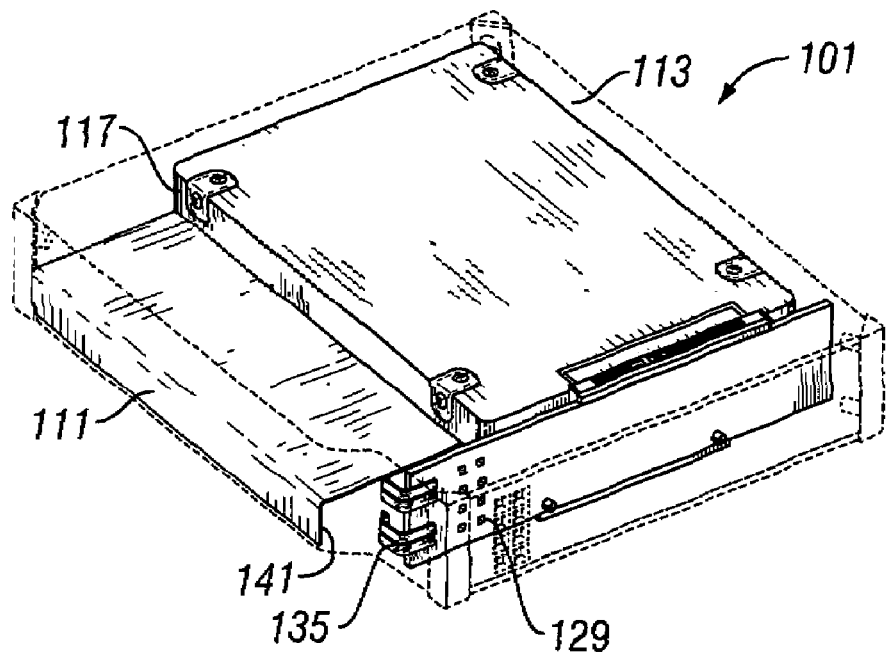
FIG. 8 shows the internal components of the media cartridge with the heat plate used for cooling in accordance with the illustrative embodiments of the current invention.

FIG. 8 illustrates the internals of the media cartridge including a heat plate in accordance with an embodiment of the present invention. The heat plate (141) may be between and thermally contacting the disk drives (117 and 118). The heat plate transfers heat from the disk drives (117 and 118) to the outside of the media cartridge (101). The heat plate (141) may be formed of any suitable material that has a high thermal transfer coefficient, for example copper, aluminum, and copper alloys. The heat plate (141) may have various shapes. The heat plate may extend to any external surface of the media cartridge. An external surface may be, for example, side surface (111). In the exemplary embodiment shown, the heat plate (141) has a unshaped structure, where the sides of the heat plate (141) extend outside the media cartridge and form a portion of the side surfaces (111 and 113). The heat plate (141) may thermally contact disk drives (117 and 118) through a thermal interface material. The thermal interface material may be, for example, thermal pads, thermal grease, conformal foam, and thermally conductive epoxy, among other materials. In the exemplary embodiment shown, the thermal interface material is conformal foam.

FIG. 9 shows the bottom view of the embodiment of the present invention as shown in FIG. 8. The heat plate extends the outside of the media cartridge to form a portion of the side surface (113).

FIG. 10 shows the media cartridge (101) being inserted into a reader (201) in accordance with an illustrative embodiment of the present invention. The reader has a frame. The frame includes a front face (239) and a surface (203). The front face (239) has a guide to receive the media cartridge (101). The guide may be a rectangular opening (205). In addition, the guide may comprise a shelf internal to the reader. The shelf may further support a media cartridge as the media cartridge is inserted and removed from the reader. One of the surfaces of the reader (201) has a set of vents (207) to allow airflow. Although shown on surface (203) in FIG. 10, the vents (207) may be a feature of any of the surfaces of the reader (201). The media cartridge (101) is inserted into the reader (201) in the direction shown by the arrow. The reader (201) supplies power to the media cartridge (101) via the sliding contacts of the media cartridge. The reader (201) uses the sliding contacts, or a set of transceivers, to read and write data to the disk drives (117 and 118) via the media cartridge's data interface component or the power interface component. The sliding contacts may be, for example, the sliding contacts (135) in FIG. 9. The reader (201) also provides cooling for the media cartridge (101).

FIG. 11 shows an exemplary embodiment cross-section of the reader (201) having a media cartridge (101) inside. The reader (201) provides forced convection cooling. The reader (201) may have vents (207) on three side surfaces of the reader (201). One or more reader fans can be located on any surface of the reader (201). For example, the reader fan (221) is located on a back face (231). The back face (231) is the face opposite the front face (239). The fan (121) on the media cartridge (101) forces hot air from within the media cartridge (101) to the surroundings. This hot air can either escape through the vents (207) on the reader or spread inside the reader. The fan (221) forces air out of the reader (201). This embodiment, with the fan (221), provides cooling even if the fan (121) on the media cartridge (101) is absent.

Reader (201) includes one or more power and data interface contacts (235). The data interface contacts are supported by the frame, for example surface (203). The power and data interface contacts (235) may matingly engage with sliding contacts (135) of FIG. 8 when a media cartridge is fully inserted into the reader. The media cartridge may be fully inserted into the reader before any portion of the media cartridge reaches a back surface (231) or fan (221) of the reader.

An alternative embodiment reader to the reader (201) may comprise at least one optical transceiver that may correspond with an optical transceiver of an inserted media cartridge. Such a media cartridge may be, for example, media cartridge (101) of FIG. 2. Such an alternate embodiment reader may operate without data contacts shown in FIG. 11 as power and data interface contacts (235).

Figure 12:
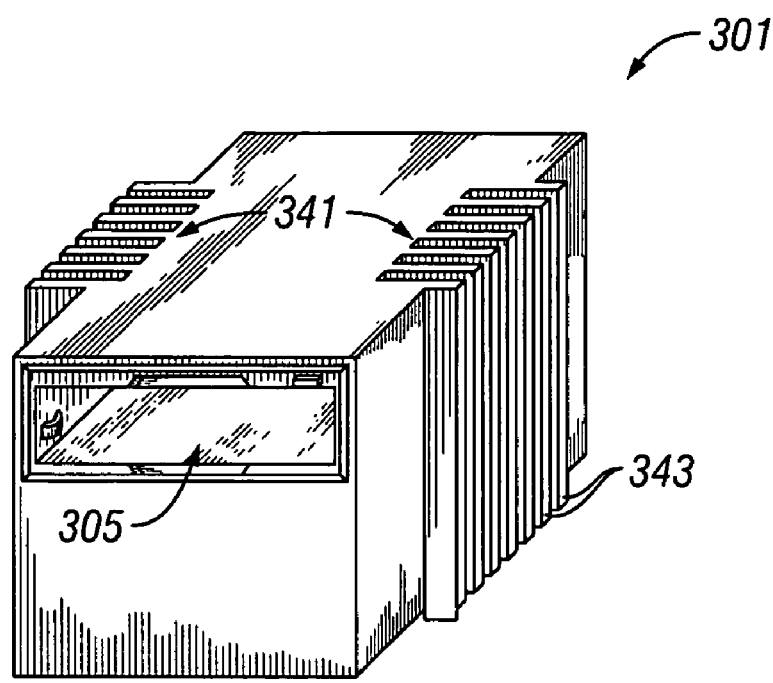
FIG. 12 shows a reader with heat sinks in accordance with an illustrative embodiment of the present invention.

FIG. 12 shows the media cartridge inside a reader (301) that provides cooling through conduction in accordance with an embodiment of the current invention. The media cartridge may be, for example, the media cartridge (101) of FIG. 2. The reader provides one or more heat sinks (341) placed on side surfaces. Thus, a media cartridge inserted inside the reader (301) thermally contacts the inner surface of the heat sink (341). The heat plate of the media cartridge transfers heat from disk drives to the heat sink. The heat sink (341) includes one or more heat sink fins (343). The heat sink fins (343) increase the surface area of the heat sink, which in turn improves the cooling rate of the heat sink (341).

Figure 13:
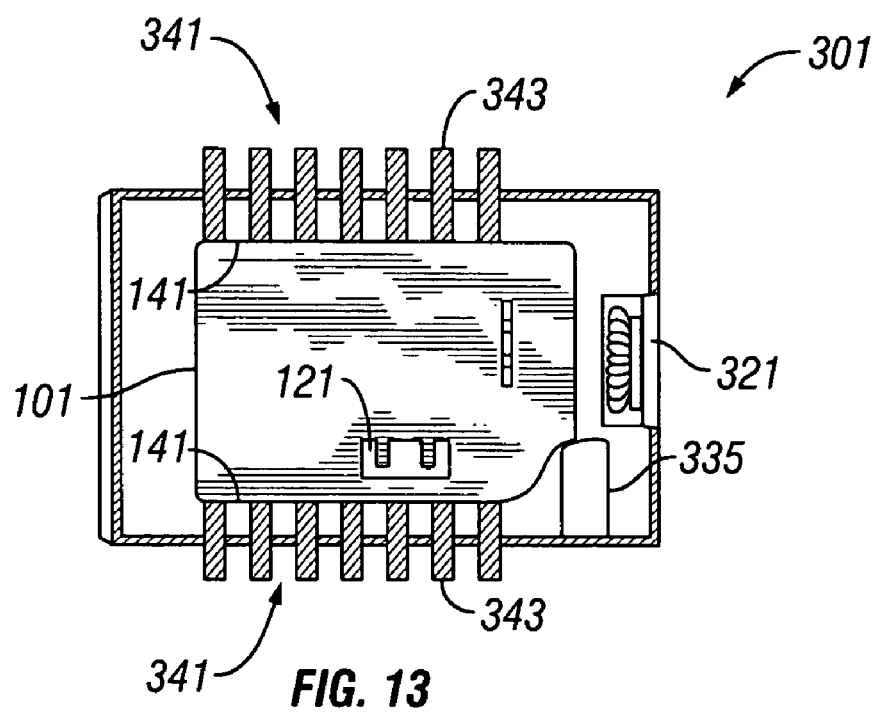
FIG. 13 shows a cross-section of a second illustrative embodiment of a reader with a media cartridge inside.

FIG. 13 shows the cross-sectional view of the reader (301) shown in FIG. 12. The heat plate (141) is mostly obscured by a substantially rectangular surface of the media cartridge (101). Nevertheless, portions of the heat plate (141) extend to the sides of the media cartridge. The sides, in turn, contact the heat sink (341) of the reader when the media cartridge is inserted into the reader. The heat can be carried away form the heat sink by natural convection and radiation. The heat can also be carried away by passive cooling methods, for example, heat pipes. In addition, active cooling methods may also carry away heat, for example, liquid cooling.

Reader (301) includes one or more power and data interface contacts (335). The power and data interface contacts (335) may matingly engage with sliding contacts when a media cartridge is fully inserted into the reader. The media cartridge may be fully inserted into the reader before any portion of the media cartridge reaches a back surface (331) or fan (321) of the reader. The reader (301) may also house a thermostatic controller to control cooling components inside the reader as well as the cooling components inside the cartridge (101). Thus, the reader can control the rate of cooling of the cartridge. A plurality of temperature sensors may be housed inside the reader, or the temperature sensors housed inside the cartridge (101) may be used to sense the temperature of the cartridge (101).

Figure 14:
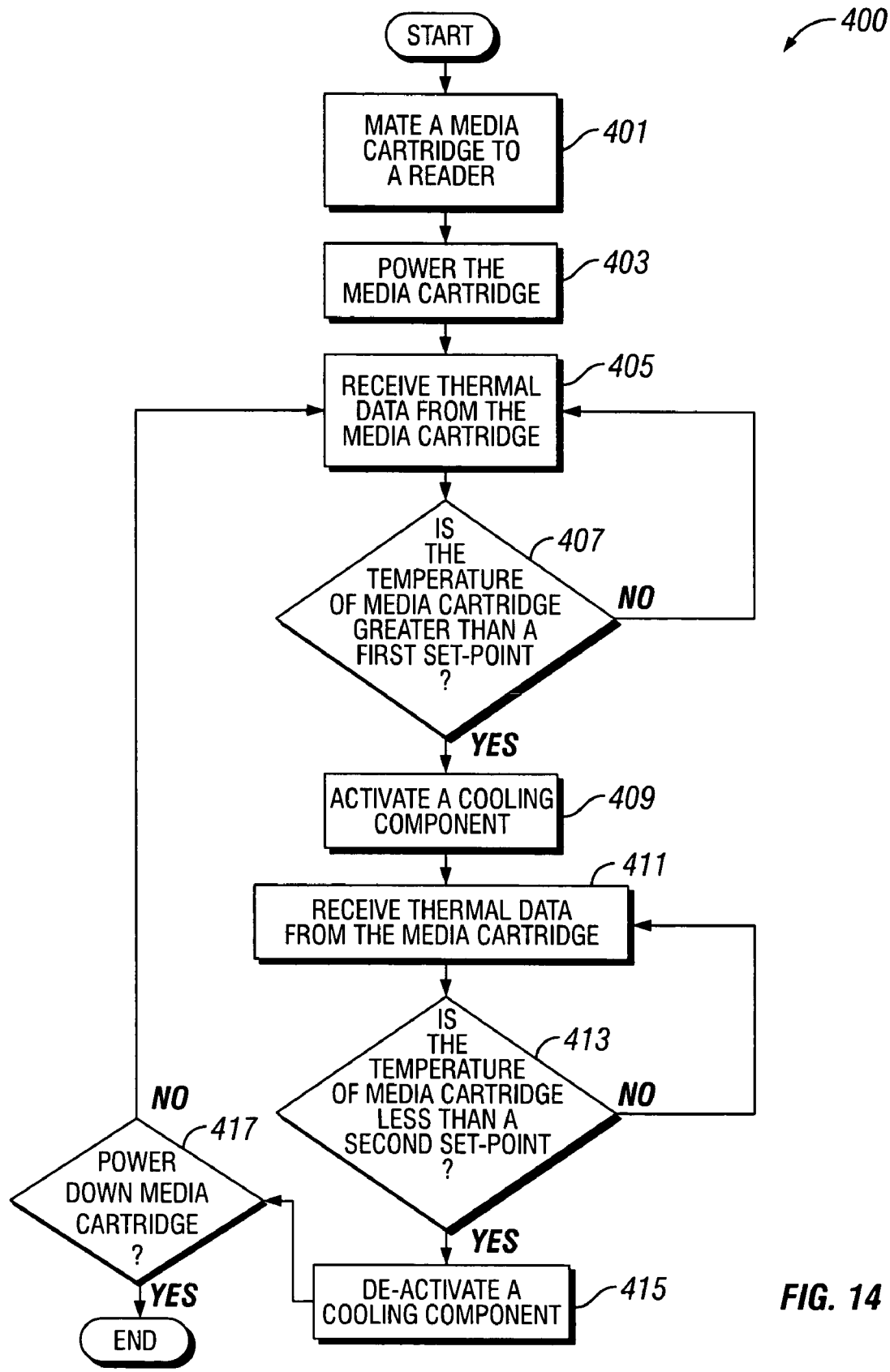
FIG. 14 shows a flow diagram of a process for cooling a media cartridge in accordance with an embodiment of the present invention.

FIG. 14 shows a flow diagram of a process for cooling a media cartridge in accordance with an embodiment of the current invention. A media cartridge is mated with a reader (Step 401). An example of such a mating is shown in FIG. 10, where the cartridge is inserted into the reader. The cartridge, as a whole or in part, may reside within the reader. The reader may provide power (Step 403) to the cartridge, either by physical contact with the power interface component of the cartridge, or via an inductive coupling. The thermostatic controller receives the internal temperature of the cartridge (Step 405). The internal temperature data is then compared to a first set-point (Step 407).

If the temperature is lower than the first set-point, the thermostatic controller continues sensing the temperature (Step 405). If the temperature exceeds the first set-point, then the thermostatic controller activates one or more cooling components (Step 409). For example, the cooling components may be the fan (121) in FIG. 7, the heat plate (141) in FIG. 8, the fan (221) in FIG. 11 or any similar cooling component. The thermostatic controller senses the internal temperature of the cartridge by receiving temperature data from the temperature sensors (Step 411). If the temperature is greater (Step 413) than a second set-point, then the thermostatic controller continues sensing the temperature (Step 411). If the temperature goes below the second set-point, then the thermostatic controller de-activates one or more cooling components (Step 415). The first set-point and the second set-point may be kept unequal in order to introduce hysteresis. Hysteresis prevents rapid switching between activation and de-activation of the cooling components. The thermostatic controller may also regulate the rate of cooling of the cooling components. For example, the thermostatic controller may regulate the speed of the fan (121) in FIG. 7, to vary the rate of cooling to achieve optimal tradeoff between the data transfer rate and the power consumed by the cooling components. If the media cartridge is ready to be powered down (Step 417) then the cooling process is ended. If the media cartridge continues to be powered, then the thermostatic controller continues to receive thermal data from the media cartridge (Step 405).

The cooling functions provided by the present invention may allow for higher power dissipation to occur within the data cartridge for a given internal cartridge operating temperature. In the case of multiple drives, a redundant-array-of-independent-drives (RAID) system architecture can provide for mirroring and/or stripping. Cartridge to reader connection options are provided by one or more of sliding contacts, optical transceivers, transceivers using alternate technologies. The sliding contact option provides for reliable connections that support a high number of insertion cycles by using the power supply current to create gas-tight connections. By superimposing data and/or control signals on the sliding contacts these low power signals can utilize the connection integrity created by the higher current power supply signals. The wireless transceiver options may reduce wear and the inductive coupling option could be extended to provide for higher current power supply signals. The bumpers and/or elastic cartridge framework provide shock absorption during routine cartridge handling or drops.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A media cartridge comprising:
    a first substantially rectangular surface;
    a second substantially rectangular surface;
    a plurality of side surfaces, wherein the first substantially rectangular surface and the second substantially rectangular surface are connected by the plurality of side surfaces;
    a first disk drive assembly enclosed by the first substantially rectangular surface, the second substantially rectangular surface, and the plurality of side surfaces;
    a second disk drive assembly enclosed by the first substantially rectangular surface, the second substantially rectangular surface, and the plurality of side surfaces;
    a first cooling component configured to cool the first disk drive assembly;
    a printed circuit board (PCB), operatively connected to the first disk drive assembly, the second disk drive assembly, and the first cooling component, comprising:
        a power interface component configured to provide, from an external reader, power to the first disk drive assembly, the second disk drive assembly, and the first cooling component;
        a data interface component configured to:
            provide, to the external reader, access to data stored on the first disk drive assembly and the second disk drive assembly; and
            provide, to the external reader, control of the first cooling component.

2. The media cartridge of claim 1, wherein the power interface component carries data and control signals.

3. The media cartridge of claim 1, wherein the power interface component receives power via inductive coupling.

4. The media cartridge of claim 1, wherein the data interface component is a wireless transceiver.

5. The media cartridge of claim 1, wherein the data interface component is an optical transceiver, wherein the one of the plurality of side surfaces comprises at least one optical aperture aligned with the optical transceiver.

6. The media cartridge of claim 1, wherein the power interface component extends to an external surface of one of the plurality of side surfaces.

7. The media cartridge of claim 1, wherein the first cooling component comprises a fan.

8. The media cartridge of claim 1, further comprising:
    a second cooling component, wherein the second cooling component comprises a vent.

9. The media cartridge of claim 8, wherein the vent is located on a surface selected from a group consisting of the first substantially rectangular surface, the second substantially rectangular surface, and one of the plurality of side surfaces.

10. The media cartridge of claim 1, wherein a bumper is disposed on an edge formed by a portion of at least one of the plurality of side surfaces.

11. The media cartridge of claim 1, wherein the media cartridge is configured to be inserted in one of a plurality of media cartridge store cells within an automated storage library.

* * * * *